United States Patent [19]

Clement

[11] 4,182,116

[45] Jan. 8, 1980

[54] CONNECTING ELEMENT FOR LINK CHAIN STRANDS OF PLOUGH OR CONVEYOR CHAINS EMPLOYED IN UNDERGROUND MINING

[76] Inventor: Anton Clement, Schattweg 3, 5860 Iserlohn-Letmathe, Fed. Rep. of Germany

[21] Appl. No.: 913,034

[22] Filed: Jun. 7, 1978

[30] Foreign Application Priority Data

Jun. 10, 1977 [DE] Fed. Rep. of Germany ....... 2726235

[51] Int. Cl.$^2$ ...................... F16G 15/04; B65G 17/00
[52] U.S. Cl. .......................................... 59/93; 74/249
[58] Field of Search .................. 59/93, 86, 85, 78, 88, 59/84, 35; 74/248, 249, 250 C; 24/116

[56] References Cited

U.S. PATENT DOCUMENTS

| | | | |
|---|---|---|---|
| 3,795,951 | 3/1974 | Ratcliff | 59/93 |
| 3,844,221 | 10/1974 | Fromme | 59/85 |
| 4,094,141 | 6/1978 | Rehbein | 59/93 |

FOREIGN PATENT DOCUMENTS

| | | | |
|---|---|---|---|
| 2358308 | 6/1975 | Fed. Rep. of Germany . | |
| 130344 | 12/1950 | Sweden | 59/86 |
| 1407149 | 9/1975 | United Kingdom | 59/86 |

Primary Examiner—Francis S. Husar
Assistant Examiner—Gene P. Crosby
Attorney, Agent, or Firm—Michael J. Striker

[57] ABSTRACT

A connecting element for connecting two link chain strands comprises a central oval chain member, and two coupling links each having an axis and two axial ends and connected to the chain member and one of the link chain strands. Each coupling link is composed of a U-shaped suspension part and a W-shaped base part whose legs and projections interdigitate with one another in a comb-like manner. A coupling bolt extends through the legs and projections so as to connect the base part with the suspension part of each coupling link. Grooves of the base part which are bounded by the projections, extend from a front end face of the base part through the region of the coupling bolt and further up to an axis of a through bore through which latter the chain member extends. Side walls bounding these grooves and located adjacent to a longitudinal axis of the chain link diverge outwardly in the transverse direction in the region outside of the coupling bolt and near the through bore. The transverse cross section of the legs of the suspension part corresponds to the transverse cross section of the central projection of the base part.

19 Claims, 5 Drawing Figures

CONNECTING ELEMENT FOR LINK CHAIN STRANDS OF PLOUGH OR CONVEYOR CHAINS EMPLOYED IN UNDERGROUND MINING

BACKGROUND OF THE INVENTION

The invention relates to a connecting element for link chain strands of plough or conveyor chains employed in underground mining, which consists of a central oval round chain member and two separable coupling links each of which consists of a base part having a bore penetrated by the round chain member and an approximately U-shaped suspension part, of which the latter is form-lockingly insertable with its both legs into recesses of the base part and is arrestable therein by a coupling bolt.

The state of the art is documented by a connecting element which has become known in the framework of the German Offenlegungsschrift No. 23 58 308. In this connecting element, the legs of the U-shaped suspension parts are formed in hammerhead-like configurations. The recesses corresponding thereto are then provided one-sidedly in the base parts. Consequently, for connecting the suspension parts with the base parts, the legs have also to be fitted in from one side into the recesses. Subsequently thereto, they are connected by a coupling bolt the cross section of which, however, is considerably smaller than the thickness of the coupling member in the region of the vertical transverse plane.

In the known construction, accordingly, neither the depth of the grooves nor the thickness of the legs reaching into the grooves is equal to the thickness of the coupling members, due to the only one-sidedly performed formation of the grooves. As a result of this, not insignificant cross sections of the base part and of the suspension part are missing for the tensile forces transmission. It has been further established that the uninterrupted fiber flow in the tension direction, which is initially manufactured during forging, is again interrupted by the hammerhead-like recesses and their aftertreatment. Thus, the then still remaining rest cross sections do not suffice in the required degree any longer to offer the necessary resitance to the lasting loads composed of tensile and bending stresses, for the duration of the operation. Breaks and extractions are frequent resulting phenomena.

The one-sided arrangement of the recesses has been established to be unsatisfactory during the practical use even for another reason, though. More particularly, such connecting elements when used in underground mining are by no means subjected only to pure tensile stresses. Rather, transverse forces are additionally exerted on the suspension parts and on the base parts, which aim at bending the coupling members approximately in the region of the coupling bolt connecting the suspension parts with the base parts, relative to each other. As a consequence thereof, the legs of the suspension parts tend to, in turn, emerge out of the one-sidedly provided recesses of the base parts, with the result that the relatively weakly configurated coupling bolt is subjected to high shearing stresses. However, the coupling bolt is no match to these stresses. It becomes destroyed so that the suspension parts necessarily dissociate themselves from the base parts. However, as a result of this, the connecting element falls apart and cannot perform the function entrusted to it any longer. Nevertheless, an increase of the bolt cross section cannot be attended to in that then the rest cross sections of the coupling member which is dependent as to its thickness on the dimension of the round member chain, would be still more reduced and an additional weakening of the transmission of the tensile forces would result therefrom.

It has been further found in connection with the known connecting element that, owing to the permanent frictional contact of the relatively narrow side surfaces of the base parts with the chain guiding tracks in the conveyor or in the plough guide, the material of the base parts is relatively strongly eroded in the region of the side surfaces. As a result of this, the tensile forces transmitting cross sections especially of the base parts become increasingly smaller and smaller and finally lose their function of being able to transmit tensile forces to the required degree altogether.

SUMMARY OF THE INVENTION

Accordingly, it is a task of the invention to so improve a connecting element of the initially mentioned type that it assures an unobjectionable transmission of tensile forces over a possibly long period of use, under intentional consideration of the wear stresses, which cannot be avoided, of the narrow side surfaces of the coupling members which are in frictional contact.

This problem is solved, in accordance with the invention, in that the recesses of the base part are formed by grooves extending from the transversely oriented end face approximately up to the level of the axis of the through bore, penetrating the base part over the entire thickness, and having substantially parallel side walls of which the groove side walls neighboring the central longitudinal axis of the coupling link diverge outwardly outside the cross section of the coupling bolt connecting the suspension part with the base part in the region of the through bore for the round chain member, and the tensile forces transmitting cross section of both legs of the suspension part in the vertical plane passing through the longitudinal axis of the coupling bolt approximately corresponds to the cross section in this vertical plane of the central tongue of the base part bounded by the two grooves.

Each coupling member of such a connecting element, consequently, consists of a substantially W-shaped base part with a thickened central tonge section and two outer finger-like webs, as well as of a U-shaped suspension part the legs of which, which are substantially devoid of steps at their exposed surfaces and extend along a straight line, reach in a form-locking fashion into the grooves formed by the tongue and by the webs and, in this position, are unequivocally clamped with one another by a coupling bolt penetrating through the legs of the suspension part as well as the tongue and the webs of the base part. The straight side walls of the grooves and, correspondingly thereto, also of the legs, render it possible to achieve exact fit and, thus assure unproblematically definable hole jamb pressures. The straight-line configuration of the connecting region of the base part with the suspension part further has the significant advantage that the fiber flow which is produced during forging and lies in the direction of the tensile forces, is no longer damaged, as it is in the known connecting element, even during the aftertreatment of the legs and of the grooves in order to achieve narrow fits. The fiber flux suffers a minute interruption merely in the region of the bore cross sections for the coupling bolt. The rest cross sections which intentionally remain in the closed fiber flux about the bores in the legs, the tongue, and the webs, are, however, sufficient to satisfy, without any problems, the permanent or periodic loadings occuring during the operational use.

Tests performed on location have proven that connecting elements of the construction according to the invention withstand cyclical loading stresses which correspond to those of closed oval round chain members. In this manner, the weak portion which has heretofore existed within the chain strand has been removed, inasmuch as, due to the triparticity of the connecting element—central oval round chain member supplemented by the endwise suspended separable coupling links—the different functions to be performed by a single member are now separated and transferred in the framework of the partial functions to the individual members of the multipartite connecting element.

The comb-like interengagement of the suspension part and of the base part results further, in an advantageous manner, in a compact, stable coupling member having large cross sections which are uninterrupeted as far as the fiber flux is concerned, circumferentially of the transverse bores for the coupling bolt. The coupling bolt is suitably formed of a strong steel bolt which then, based on its cross-sectional dimension and the dimension of the base part and suspension part rest cross sections, not only assures the secure transmission of the tensile forces, but also suffers the necessary resistance to the transverse stresses which cannot be avoided in practucal use. Herein, it is also taken care of, in the region of the through bore in the base part for the central round chain member, owing to the divergingly configurated end portions of the groove side walls which neighbor the central longitudinal axis of the coupling link, that sufficient cross sections remain between the grooves and the through bore which assure a secure tensile forces transmission.

A further substantial advantage of the embodiment according to the invention resides in the fact that, based on the narrow fit between the legs of the suspension part and the grooves of the base part in conjunction with the exact fit of the leg end sides in the groove bottom, it can be assured that transverse loads of the coupling members, which have a tendency to angularly displace the suspension part with respect to the base part, are unproblematically accepted. This results in a situation where the coupling bolt as well as the transverse bores in the suspension part and in the base part suffer hardly any friction wear. As a consequence thereof, the coupling member has a high life expectation. This circumstance renders it also possible to separate the coupling member even after a longer practical use and be able to subsequently reuse the same.

On top of this, the cross sectional dimension of the legs in the vertical plane passing through the longitudinal axis of the coupling bolt, on the one hand, and the cross-sectional dimension of the central tongue in the base part, on the other hand, and this also in this vertical plane, assure that the outer webs of the base part can be intentionally used as wearing bodies, since the cross section of the central tongue already corresponds to the cross section of the legs engaging in the grooves. Thus, the structure according to the invention very deliberately, and this from the very beginning, takes into account the fundamentally unavoidable wear stresses in the operational use, to the necessary extent.

Sufficient cross sections between the through bore in the base part for the central round chain member and the inner groove ends are assured in accordance with the invention in that the inner side wall portions diverge outwardly under an angle of approximately 30°.

For a sufficient stability of a base part, the invention further proposes that the length of its central tongue is approximately equal to the clearance manner between the central round chain member and the end member of a chain strand engaging in the suspension part. Herein, the necessary movement play between the different chain member is, of course, to be maintained.

In order to obtain a long lifespan of the connecting element, it is recommended according to the invention that the width of the outwardly situated webs of the base part approximately corresponds to the half-width of the grooves or of the legs.

In order to achieve an exact abutment of the suspension part with the base part or vice versa, a further advantageous feature of the invention is characterized in that the legs of the suspension part are step-wise offset at their outer sides and the thus formed steps come into abutment with the end faces of the outer webs of the base part. When transverse stresses are encountered, which can cause buckling of the suspension part with respect to the base part, the end faces of the outer webs consequently brace themselves against the steps of the legs and the end faces of the legs against the groove bottom and thus offer a high resistance, together with the coupling bolt, to the transverse loads.

It is then of a particular advantage in this connection that the groove bottom which is slightly rounded in cross section as well as the correspondingly rounded end sides of the legs which abut the groove bottom extend straight and at a right angle to the upper and lower sides of the base part or of the suspension part. It is further of advantage in this connection that the end surfaces of the outer webs of the base part and the surfaces of the leg steps which are located frontally opposite the same, extend straight and normal to the upper and lower sides of the base part or of the suspension part.

It can fully suffice according to the invention that the coupling bolt has a cylindrical cross section. The thickness of the coupling member then still remains in a region which not only assures sufficient tensile forces cross sections, but also makes sure that the coupling member can run without edging or clamping, even in an upright orientation, over the chain sprocket wheels arranged at the ends of conveying and ploughing arrangements.

For the purpose of achieving even narrower coupling members, it can be, contrarily, very recommendable that the coupling bolt has an oval cross section the longer axis of which extends substantially parallel to the upper and lower sides of the base part or of the suspension part. As a result of this, there exists the possibility to reduce the width of the coupling member and to consequently even better adapt the same to a chain sprocket wheel without, however, detrimentally reducing the rest cross sections circumferentially of the coupling bolt.

Finally, the invention provides, for the positional securing of the coupling bolt, that a semi-circular central circumferential groove as seen in cross section is formed in the coupling bolt, which corresponds to a corresponding bore in the base part into which a bracing pin is drivable. The bracing pin bore is then advantageously arranged immediately in the vicinity of the through bore for the central round chain member, in order not to reduce the carrying cross section of the central zone in this manner.

The invention is explained in more detail in the following with reference to an exemplary embodiment illustrated in the drawings.

DESCRIPTION OF A PREFERRED EMBODIMENT

Figure 1:
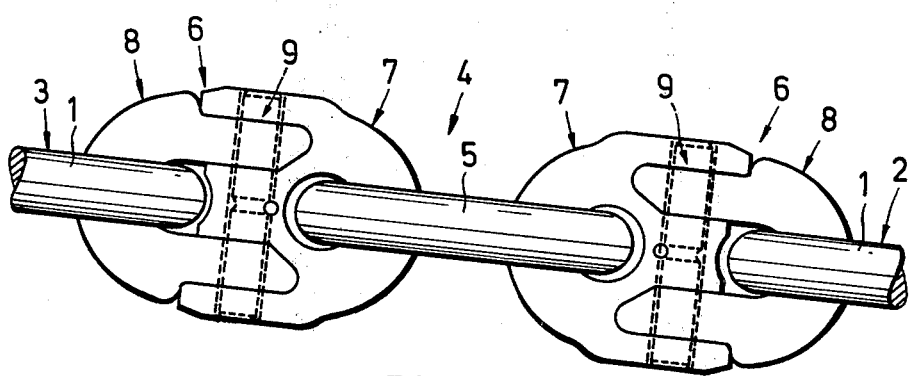
FIG. 1 in the top plan view a section of a chain strand with round chain member in the region of a connecting element.

The connecting element 4 recognizable from FIG. 1 and coupling end members 1 of two chain strands 2, 3 with one another consists of a central oval round chain member 5 as well as of two separable coupling members 6 which are endwise suspended on the round chain member.

Figure 4:
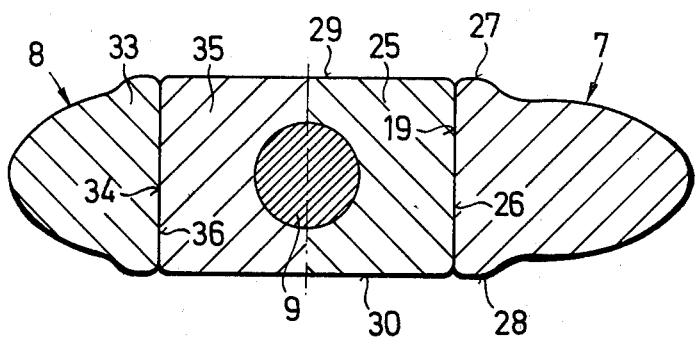
FIG. 4 a vertical longitudinal section through the coupling member of FIG. 2 according to the line IV—IV and FIG. 5 is a view corresponding to that shown in FIG. 4 but illustrating another embodiment of the invention.
Figure 5:
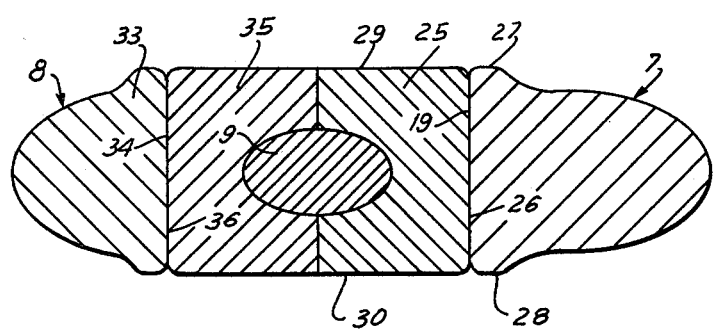

Each coupling member 6 is constituted (see also FIG. 2) by a W-shaped base part 7 undetachably connected with the central round chain member 5, and by a U-shaped suspension part 8 suspendable from the end member 1 of the chain strand 2 or 3. They are form-lockingly assembled and clampingly connected to one another by means of a positionally secured coupling bolt 9. The coupling bolt may have a cylindrical cross-section as shown in FIG. 4 of an oval cross-section as shown in FIG. 5.

Figure 2:
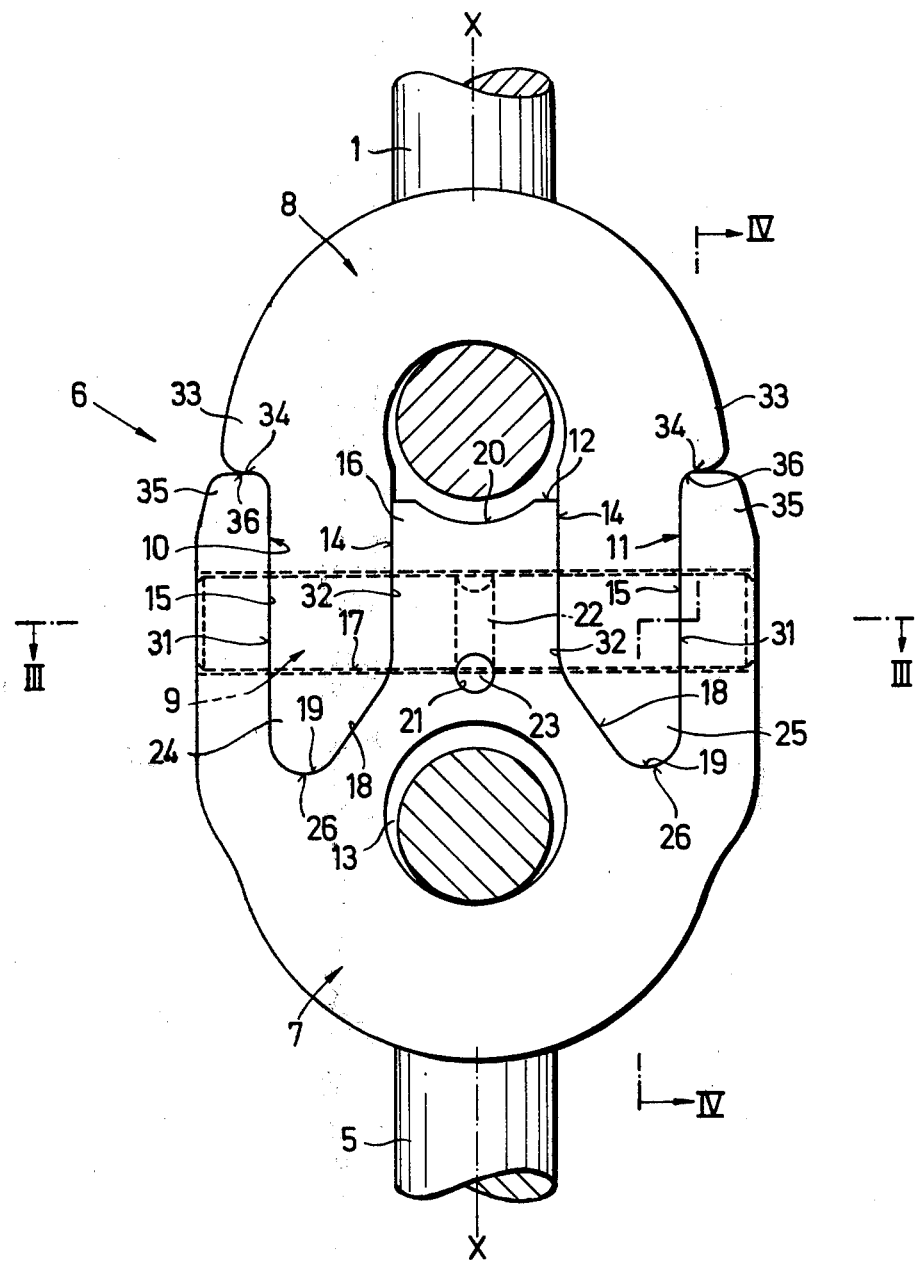
FIG. 2 in an enlarged representation and in the top plan view, partially in section, a coupling member of the connecting element of FIG. 1.

As can be ascertained particularly from FIG. 2, the W-shaped base part is provided with two grooves 10, 11 which extend from an end side 12 of the base part which end side extends transversely of a central axis x—x of the coupling member 6, up to approximately the level of an axis of a through bore 13 for the central round chain member 5. The grooves extend over the entire thickness of the base part and have side walls 14, 15 which are parallel to one another and straight-lined over a substantial length section. Herein, the distance of the side walls 14 which neighbor the central longitudinal axis x—x from one another approximately corresponds to the diameter of the through bore 13. In the region of this through bore, but outside the cross section of a transverse bore 17 for the coupling bolt, which is provided in a central tongue 16, inner end sections 18 of the side walls 14 diverge by approximately 30° outwardly and adjoin the outwardly located side walls 15 via a rounded groove bottom 19.

It can be further ascertained from FIGS. 1 and 2 that a rounded depression 20 is worked into the end side 12 of the base part 7, which assures the necessary movement play with respect to the end member 1. It can also be recognized that, in the course of the central longitudinal axis x—x, immediately next to the through bore 13 for the central round chain member 5, there is provided a vertical bore 21 of a minute diameter which corresponds with a central circumferential groove 22 of the coupling bolt 9 and into which a bracing pin 23 is driven. The cross section of the circumferential groove is half-round.

Legs 24, 25 of the U-shaped suspension part 8 are, correspondingly to the grooves 10, 11 of the base part 7, also of straight-line configurations and and fit themselves closely to the side walls 14 and 15 of the grooves in the assembled condition. Herein, it can be especially well ascertained from FIG. 4 that rounded end sides 26 of the legs 24, 25 and the groove bottom 19 which frontally opposes these end sides, are straight-lined and are arranged at right angles to upper and lower sides 27, 28 or 29, 30 of the base part 7 or of the suspension part 8. As a consequence, not only side surfaces 31, 32 of the legs exactly abut the side walls 14, 15 of the grooves 10, 11, but also the end sides 26 abut the groove bottom 19 over the entire thickness of the legs.

Furthermore, it will become apparent from a common consideration of FIGS. 2 and 4 that the legs 24, 25 are one-sidedly stepped and form rectangularly projecting steps 33 there, with which end faces 34 of the outwardly located webs 35 of the base part 7 also come in contact. Even the end faces of the webs and the surfaces 36 of the leg steps 33 which are frontally opposed thereto are, as shown in FIG. 4, of straight-lined configurations and extend rectangularly to the upper and lower sides 27, 28 or 29, 30 of the base part or of the suspension part. The base part and the suspension part are consequently, in cooperation with the coupling bolt 9, surface-clamped with one another and thus offer a substantial resistance to such transverse loads which tend to buckle the suspension part with respect to the base part about the longitudinal axis of the coupling bolt.

Figure 3:
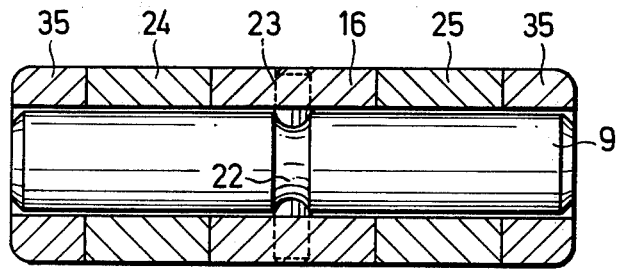
FIG. 3 a vertical cross section through the coupling member of FIG. 2 according to the line III—III.

FIG. 3 illustrates with the necessary clarity that the cross sections of the legs 24, 25 of the suspension part 8 are equally dimensioned in the region of the vertical central longitudinal axis of the coupling belt 9 as the cross section in this vertical plane of the central tongue 16 of the base part. This means that the tensile forces are transmitted exclusively over these cross sections. The cross sections of the outwardly situated webs 35 of the base part then serve exclusively as wearing bodies, wherein the worn-away material and the reduced cross section resulting therefrom have no influence on the unproblematic tensile forces transmission in the region of the legs and of the central tongue.

It will be understood that each of the elements described above, or two or more together, may also find a useful application in other types of constructions differing from the types described above.

While the invention has been illustrated and described as embodied in a connecting element for link chain strands, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A connecting element for connecting two link chain strands, particularly of plough or conveyor chains employed in underground mining, comprising a central oval chain member; two coupling links each having a longitudinal axis and two axial ends, each of said coupling links being connected with said central chain member at one axial end and with one of the link chain strands at the other axial end, each of said coupling links including a base part having a plurality of grooves extending in an axial direction and a through bore through which said central chain member extends, and a U-shaped suspension part having a plurality of legs extending also in the axial direction and form-lockingly engaging in said grooves of said base part; and a coupling bolt extending through said parts in a direction transverse to said axial direction and arresting said parts with each other, said base part having a front end face facing toward said suspension part, each of said grooves of said base part extending from said front end face through the region of said coupling bolt and then substantially up to the region of an axis of said through bore, piercing said base part over its entire thickness and being bounded by substantially parallel side walls extending in said axial direction, the side walls located adjacent to said longitudinal axis diverging outwardly in the transverse direction outside of the region of said coupling bolt and in the region of said through bore, said base part having a plurality of projections bounding said grooves therebetween and including a central projection which extends along said longitudinal axis and is bounded by two of said grooves, each of said legs of said suspension part having a cross section, in a plane extending in the transverse direction along an axis of said coupling bolt, which transmits tensile strength and substantially corresponds to the cross section of said central projection of said base part.

2. A connecting element as defined in claim 1, wherein the axis of said through bore of said base part extends in a direction transverse to said longitudinal axis of said chain member.

3. A connecting element as defined in claim 1, wherein said coupling bolt extends through said legs of said suspension part and said projections of said base part.

4. A connecting element as defined in claim 1, wherein said central chain member has a round cross section.

5. A connecting element as defined in claim 1, wherein said base part is substantially W-shaped.

6. A connecting element as defined in claim 1, wherein each of said side walls located adjacent to said longitudinal axis diverges radially outwardly at an angle substantially equal to 30°.

7. A connecting element as defined in claim 1, wherein said suspension member has an inner recess through which a respective one of the link chain strands extends and which is spaced from said through bore of said base part in said axial direction, said central chain member having two ends each extending through one of said coupling links and axially spaced from the link chain strands extending through the same coupling link so as to define a clearance, said central projection of said base part having a length, as considered in said axial direction, which is substantially equal to said clearance.

8. A connecting element as defined in claim 1, wherein each of said grooves of said base part and said legs of said suspension part has a predetermined width measured in the transverse direction, each of said projections of said base part having an outer web portion which faces toward said suspension part and has a width measured in said transverse direction which substantially corresponds to the width of each of said grooves and legs.

9. A connecting element as defined in claim 1, wherein said coupling bolt is cylindrical.

10. A connecting element as defined in claim 1, wherein said coupling bolt has a circumferential surface and a semi-circular groove provided in the latter, said base portion having a semi-circular groove which together with said semi-circular groove of said coupling bolt forms a circular receiving groove; and further comprising a bracing pin inserted into said receiving groove.

11. A connecting element as defined in claim 1, wherein said through bore has a predetermined diameter, said central projection of said base part having a width, measured in the transverse direction, which is substantially equal to the diameter of said through bore.

12. A connecting element as defined in claim 1, wherein said projections of said base part include two projections which outwardly surround two legs of said suspension part as considered in the transverse direction, each of said two projections of said base part having an outer web portion arranged at said front end face, each of said two legs surrounded by said two projections having a portion which is outwardly offset in said transverse direction in a stepped manner so that the outer web portion of each of said projections of said base part abuts against the offset portion of a respective one of said legs of said suspension part.

13. A connecting element as defined in claim 12, wherein said legs of said suspension part have end faces located substantially in the region of said through bore of said base part, said offset portions of said legs of said suspension part being spaced from said end faces of said legs in said axial direction away from said through bore.

14. A connecting element as defined in claim 12, wherein said base part and said suspension part each have two side faces which are located at opposite sides of said longitudinal axis and extend substantially parallel to one another and normal to said side walls of said base part, the outer web portions of said projections of said base part and the offset portions of said legs of said suspension part having end surfaces which abut against each other, are straight and extend normal to said side faces of said base part and suspension part.

15. A connecting element as defined in claim 1, wherein said base part and said suspension member each have two side faces which are located at opposite sides of said longitudinal axis and extend substantially parallel to one another and substantially normal to said side walls of said base part, each of said grooves of said base part having a bottom portion, and each of said legs of said suspension part having a bottom section received in the bottom portion of a respective groove of said base part, said bottom portions of said grooves and said bottom sections of said legs are straight and extend normal to said side faces of said base part and suspension part.

16. A connecting element as defined in claim 15, wherein said bottom portions of said grooves of said base part are complementary to said bottom sections of said legs of said suspension part, said bottom portions and bottom sections having a rounded cross section as considered in a plane which is parallel to said side faces of said base part and suspension part.

17. A connecting element as defined in claim 15, wherein the side faces of said base part are flush with the side faces of the suspension part.

18. A connecting element as defined in claim 15, wherein said coupling bolt has an oval cross section.

19. A connecting element as defined in claim 18, wherein said cross section of said coupling bolt has a longer axis which is substantially parallel to said side faces of said base part and suspension part.

* * * * *